(12) United States Patent
Kim et al.

(10) Patent No.: US 7,185,257 B2
(45) Date of Patent: Feb. 27, 2007

(54) DATA TRANSMITTING/RECEIVING METHOD IN HARQ DATA COMMUNICATION SYSTEM

(75) Inventors: Min-Koo Kim, Suwon-shi (KR); Dong-Seek Park, Suwon-shi (KR); Chang-Hoi Koo, Songnam-shi (KR); Dae-Gyun Kim, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 901 days.

(21) Appl. No.: 10/004,417

(22) Filed: Oct. 22, 2001

(65) Prior Publication Data
US 2002/0093937 A1 Jul. 18, 2002

(30) Foreign Application Priority Data
Oct. 21, 2000 (KR) ............... 2000-62152

(51) Int. Cl.
*H03M 13/00* (2006.01)
(52) U.S. Cl. ............ 714/751; 714/724; 714/774
(58) Field of Classification Search ......... 714/751, 714/774, 764, 48, 779, 749, 750, 752, 38, 714/724; 370/328
See application file for complete search history.

(56) References Cited

U.S. PATENT DOCUMENTS

| 4,329,708 | A | * | 5/1982 | Yamamoto et al. | ......... 348/617 |
| 5,511,099 | A | * | 4/1996 | Ko et al. | ............. 375/368 |
| 5,629,948 | A | * | 5/1997 | Hagiwara et al. | .......... 714/748 |
| 5,648,967 | A | * | 7/1997 | Schulz | ............ 370/328 |
| 5,768,533 | A | * | 6/1998 | Ran | ............. 709/247 |
| 6,085,252 | A |   | 7/2000 | Zhu et al. | |
| 6,308,294 | B1 | * | 10/2001 | Ghosh et al. | ............ 714/751 |
| 6,937,566 | B1 | * | 8/2005 | Forslow | ............ 370/231 |

FOREIGN PATENT DOCUMENTS

| JP | 06-204988 | 7/1994 |
| WO | WO 00/25469 | 5/2000 |
| WO | WO 00/52873 | 9/2000 |

OTHER PUBLICATIONS

Wang et al., "Optimal Adaptive Multireceiver ARQ Protocols", IEEE Transactions on Communications, Dec. 1993, No. 12, pp. 1816-1829.
Cheng et al., "Efficient Partial Retransmission ARQ Strategy with Error Detection Codes by Feedback Channel", IEE-Proc.-Commun., vol. 147, No. 5, Oct. 2000, pp. 263-268.

* cited by examiner

*Primary Examiner*—Albert Decady
*Assistant Examiner*—Fritz Alphonse
(74) *Attorney, Agent, or Firm*—The Farrell Law Firm

(57) ABSTRACT

There is provided a data transmitting/receiving method in an HARQ data communication system. To transmit a physical layer information stream having a plurality of sub-blocks, each sub-block having an error correction code, a QoS (Quality of Service), and a priority if the sub-blocks has a different QoS, the encoded physical layer information stream is divided into a plurality of slots. The slot data are sequentially transmitted to a receiver in predetermined time intervals. If an HARQ (Hybrid Automatic Repeat Request) message for the initial slot data is received from the receiver, indicating that at least one of the sub-block in the initial slot data has a reception error and the other sub-blocks are good in reception, slot data with a sub-block having an error repeated within the number of the sub-blocks is retransmitted after transmission of initial slot data.

9 Claims, 8 Drawing Sheets

DATA TRANSMITTING/RECEIVING METHOD IN HARQ DATA COMMUNICATION SYSTEM

PRIORITY

This application claims priority to an application entitled "Data Transmitting/Receiving Method in HARQ Data Communication System" filed in the Korean Industrial Property Office on Oct. 21, 2000 and assigned Ser. No. 2000-62152, the contents of which are hereby incorporated by reference.

BACKGROUND OF THE INVENTION

1. Field of the Invention

The present invention relates generally to a data transmitting device and method for a wireless communications system, and in particular, to a device and method for retransmitting data that has errors during transmission.

2. Description of the Related Art

For forward packet data transmission, a mobile station is assigned a forward channel such as a dedicated channel (DCH) from a base station. Wireless communications systems as mentioned below include satellite systems, ISDN, digital cellular systems, W-CDMA, UMTS, and IMT-2000. Upon receipt of the forward packet data, the mobile station determines whether the reception is successful and if it is, the mobile station transmits the packet data to its higher layer. On the other hand, if errors are detected from the packet data, the mobile station requests its retransmission by the HARQ (Hybrid Automatic Repeat Request) scheme. HARQ is a retransmission scheme using both FEC (Forward Error Correction) and ARQ (Automatic Repeat Request) for requesting retransmission of a data packet having errors. HARQ increases transmission throughput and improves system performance by channel coding for error correction. The main channel coding methods are convolutional coding and turbo coding.

A HARQ system uses soft combining to increase throughput. There are two types of soft combining: packet diversity combining and packet code combining. These are also referred to as soft packet combining. Despite having lower performance characteristics relative to packet code combining, packet diversity combining is widely used when performance loss is low, due to its simple implementation.

In general, it is known that there is little performance difference between packet diversity combining and packet code combining for convolutional codes with a low code rate. However, the difference is conspicuous for turbo codes because iterative decoding and parallel recursive convolutional codes are used. For the turbo codes, packet code combining offers a greater performance gain than packet diversity combining.

In this case, it is difficult to transmit multiple data. "Multiple data" is defined as data with different characteristics or service qualities in one packet. Wireless communications systems do not transmit multiple data. Therefore, the existing methods have limitations in carrying out transmission and retransmission of multiple data. Moreover, existing systems cannot increase transmission throughput when multiple data is retransmitted by ARQ.

SUMMARY OF THE INVENTION

It is, therefore, an object of the present invention to provide an HARQ scheme by which to implement a system using packet code combining and packet diversity combining selectively depending on data rates.

It is another object of the present invention to provide a method of efficiently transmitting multiple data in a packet.

It is a further object of the present invention to provide a method of transmitting multiple data for a reduced transmission time in order to increase a transmission gain.

The foregoing and other objects can be achieved by providing a data transmitting/receiving method in an HARQ data communication system. To transmit a physical layer information stream having a plurality of sub-blocks, each sub-block having an error correction code, a QoS (Quality of Service), and a priority if the sub-blocks has a different QoS, the encoded physical layer information stream is divided into a plurality of slots. The slot data are sequentially transmitted to a receiver in predetermined time intervals. If an HARQ (Hybrid Automatic Repeat Request) message for the initial slot data is received from the receiver, indicating that at least one of the sub-blocks in the initial slot data has a reception error and the other sub-blocks are good in reception, slot data with a sub-block having errors, repeated within the number of the sub-blocks, is retransmitted after transmission of initial slot data.

The failed sub-block should be transmitted at least twice, and the slot data includes only the failed sub-block.

The sub-blocks are encoded using quasi-complementary turbo codes (QCTCs). A code set is generated beforehand and the initial transmission is performed using a predetermined code in the code set.

If at least one sub-block is retransmitted after the sub-blocks are transmitted a predetermined number of times, the code of the retransmission-requested sub-block is changed. The code is changed to an unused code in the code set in a predetermined order.

The repetition times of failed sub-blocks are determined according to the priorities of the sub-blocks.

If the number of the transmitted sub-blocks is an integer-multiple of the number of the failed sub-blocks, the failed sub-blocks are repeated the same number of times if the failed sub-blocks have the same priority.

If the sub-blocks are transmitted at least twice and a signal is received before the sub-blocks are transmitted at least twice, indicating that the transmitted sub-blocks have been successfully received in the receiver, the further transmission of the sub-blocks is discontinued and the sub-blocks for the next physical layer information stream are transmitted.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
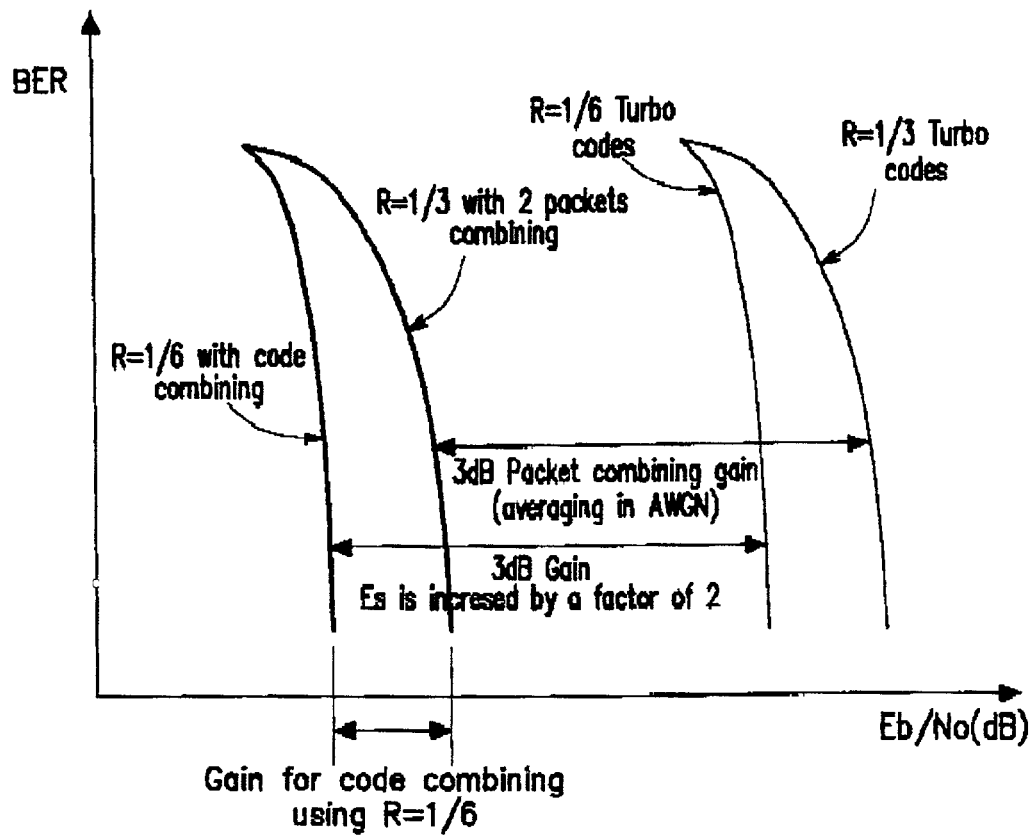
FIG. 1 is a graph showing the performance difference between packet code combining and packet diversity combining in a packet data system using turbo codes.

Preferred embodiments of the present invention will be described herein below with reference to the accompanying drawings. In the following description, well-known functions or constructions are not described in detail since they would obscure the invention in unnecessary detail.

1. Packet Code Combining

In general, a system using a retransmission scheme (e.g., HARQ) uses the packet code combining scheme to improve transmission throughput. A transmitter transmits a different code with a code rate R at each packet transmission. If an error is detected in the received packet, a receiver requests retransmission and performs soft combining between the original packet and a retransmitted packet. The retransmitted packet may have a different code from that of the previous packet. The packet code combining scheme is a process of combining received N packets with a code rate R to a code with an effective code rate of R/N prior to decoding, to thereby obtain a coding gain.

With regard to the packet diversity combining scheme, on the other hand, the transmitter transmits the same code with a code rate R at each packet transmission. If an error is detected in the received packet, the receiver requests a retransmission and performs soft combining between the original packet and the retransmitted packet. The retransmitted packet has an identical code to that in the previous packet. In this sense, the packet diversity combining scheme can be considered symbol averaging on a random channel. The packet diversity combining scheme reduces noise power by averaging the soft outputs of input symbols and achieves a diversity gain as offered by a multipath channel because the same code is repeatedly transmitted on a fading channel. However, the packet diversity combining scheme does not provide such an additional coding gain as obtained according to a code structure in the packet code combining scheme.

Due to implementation simplicity, most packet communication systems have used the packet diversity combining scheme, which is under study for application to the synchronous IS-2000 system and the asynchronous UMTS (universal Mobile Telecommunication System) system. The reason is that existing packet communication systems have used convolutional codes, and even packet code combining does not offer a great gain when convolutional codes with a low data rate are used. If a system with R=1/3 supports retransmission, there is not a wide difference in performance between the packet code combining scheme and the packet diversity combining scheme. Thus, the packet diversity combining scheme is selected considering implementation simplicity.

However, the use of turbo codes as FEC codes requires a different packet combining mechanism because the turbo codes are designed to perform very close to the "Shannon Channel Capacity Limit", and their performance varies obviously with the coding rates unlike convolutional codes. Therefore, it can be concluded that packet code combining is feasible for a packet communication system using turbo codes in a retransmission scheme to achieve the goal of optimum performance.

Accordingly, the present invention proposes a method of designing codes for optimal packet code combining, a system that selectively employs a packet code combining scheme and a packet diversity combining scheme according to the data rates, and an HARQ protocol by which this system is operated.

First, the operation of the system that selectively uses the packet code combining scheme and the packet diversity scheme combining according to the data rates will be described.

In a system using R=1/5 turbo codes, for example, packet code combining applies until the overall code rate of codes produced by soft-combining of retransmitted packets reaches 1/5. For the subsequent retransmitted packets, packet diversity combining and then packet code combining are performed. If the first packet is transmitted at a data rate of 1/3, the required redundancy symbols are provided at a retransmission request to make the overall code rate 1/5. Thus, when a receiver receives both packets, the overall code rate becomes 1/5. Each of the following packets is repeated prior to transmission and the receiver performs packet diversity combining and then packet code combining on the retransmitted packets at the data rate 1/5.

It is generally known that there is not a wide performance difference between the packet diversity combining scheme and the packet code combining scheme for convolutional codes with a low code rate. However, there is an obvious performance difference between these schemes for turbo codes, unlike convolutional codes. The Packet code combining offers a greater performance gain for turbo codes than packet diversity combining. In view of the above-described nature of the turbo codes, throughput can be improved markedly by HARQ Type II/III schemes using turbo codes.

FIG. 1 is a graph showing the performance difference between packet code combining and packet diversity combining in the case of turbo codes. As shown in FIG. 1, a turbo code with a low data rate of 1/6 exhibits a greater performance gain than a turbo code with a high code rate of 1/3 with the same symbol energy Es and obtains a performance gain of 3 dB from packet code combining. Consequently, generation of R=1/6 turbo codes by packet code combining of R=1/3 sub-codes produces a gain that turbo codes with a code rate lower than 1/3 exhibits and a gain that code combining of different codes offers, contemporaneously.

More specifically, for the same code symbol energy Es and the same given code rate, turbo codes provide performance close to the "Shannon Channel Capacity Limit" according to the code rates only if iteration decoding is fully implemented, unlike convolutional codes. It is known that a turbo code with a low code rate offers a greater performance gain than a turbo code with a high code rate with the same code symbol energy Es. For example, when R=1/3 is reduced to R=1/6, the performance difference can be estimated by analyzing a change in the "Shannon Channel Capacity Limit". The reason for assuming the same symbol energy irrespective of R=1/3 or 1/6 for the curves of FIG. 1 is that the same symbol energy Es is used for each retransmission in an HARQ system, as compared to a conventional analysis of the performance of turbo codes by checking the decrease of symbol energy caused by reduced code rates.

If an R=1/3 code is repeated once and the two codes are packet-diversity-combined on an AWGN (Additive White Gaussian Noise) channel, a maximum gain of 3 dB is obtained in terms of a symbol energy-to-noise ratio (Es/No). The same is the case with an R=1/6 code. Thus, a performance curve for the R=1/3 turbo code shifts to the left in parallel by a +3 dB scale due to a packet diversity combining gain, and a performance curve for the R=1/6 turbo code also shifts to the left in parallel by a +3 dB scale when the same symbol energy is given. Here, the performance curves are derived with respect to the energy-to-noise ratio (Eb/No) which is measured to compare code performances according to the code rates. As a consequence, the difference between the turbo code performance curves is equivalent to the performance difference between packet diversity combining and packet code combining. The performance difference according to the code rates can be estimated from the "Shannon Channel Capacity Limit" and a minimum performance difference can be obtained using a minimum required signal-to-noise ratio (SNR).

2. Minimum Required Eb/No for Code Rates

In a system using turbo codes with a code rate R and a very large encoder block size L, a minimum Eb/No required to provide an error-free channel is expressed as $$Eb/No > (4^R - 1)/2R \quad (1)$$

According to the above equation, the minimum required Eb/No in AWGN at each code rate for the turbo codes is listed in Table 1 below In Table 1, a typical Eb/No indicates a required Eb/No for a bit error rate (BER) below 0.00001 when the encoding block size L of the turbo codes is 1024.

TABLE 1

| Code rates | Required Eb/No (dB) | Typical Eb/No (dB) for BER = $10^{-5}$ |
|---|---|---|
| 3/4 | 0.86 | 3.310 |
| 2/3 | 0.57 | 2.625 |
| 1/2 | 0.00 | 1.682 |
| 3/8 | −0.414 | 1.202 |
| 1/3 | −0.55 | 0.975 |
| 1/4 | −0.82 | 0.756 |
| 1/5 | −0.975 | 0.626 |
| 1/6 | −1.084 | 0.525 |
| 0 | −1.62 | NA |

As shown in Table 1, the required Eb/No are 0.86, 0.57, 0.0, −0.414, −0.55, −0.82, −0.975, and −1.084 dB respectively, for the code rates of 3/4, 2/3, 1/2, 3/8, 1/3, 1/4, 1/5, and 1/6. A performance difference of at lea exists between a system using an R=1/3 code and a system using an R=1/6 code. This is a minimum performance difference based on the "Shannon Channel Capacity Limit". In addition, when considering implementation of a real decoder and system environment, the difference becomes wider. During a simulation, an approximately 1.12 dB performance difference was observed between a system using packet code combining for R=2/3 codes and a system using packet diversity combining for the R=2/3 codes.

Table 2 shows the performance difference between packet code combining and packet diversity combining after one retransmission in a system with a sub-code code rate of 2/3. As shown in Table 2, a minimum performance difference is 1.12 dB and the packet code combining scheme produces a higher performance gain in the system using turbo codes.

TABLE 2

Figure 2:
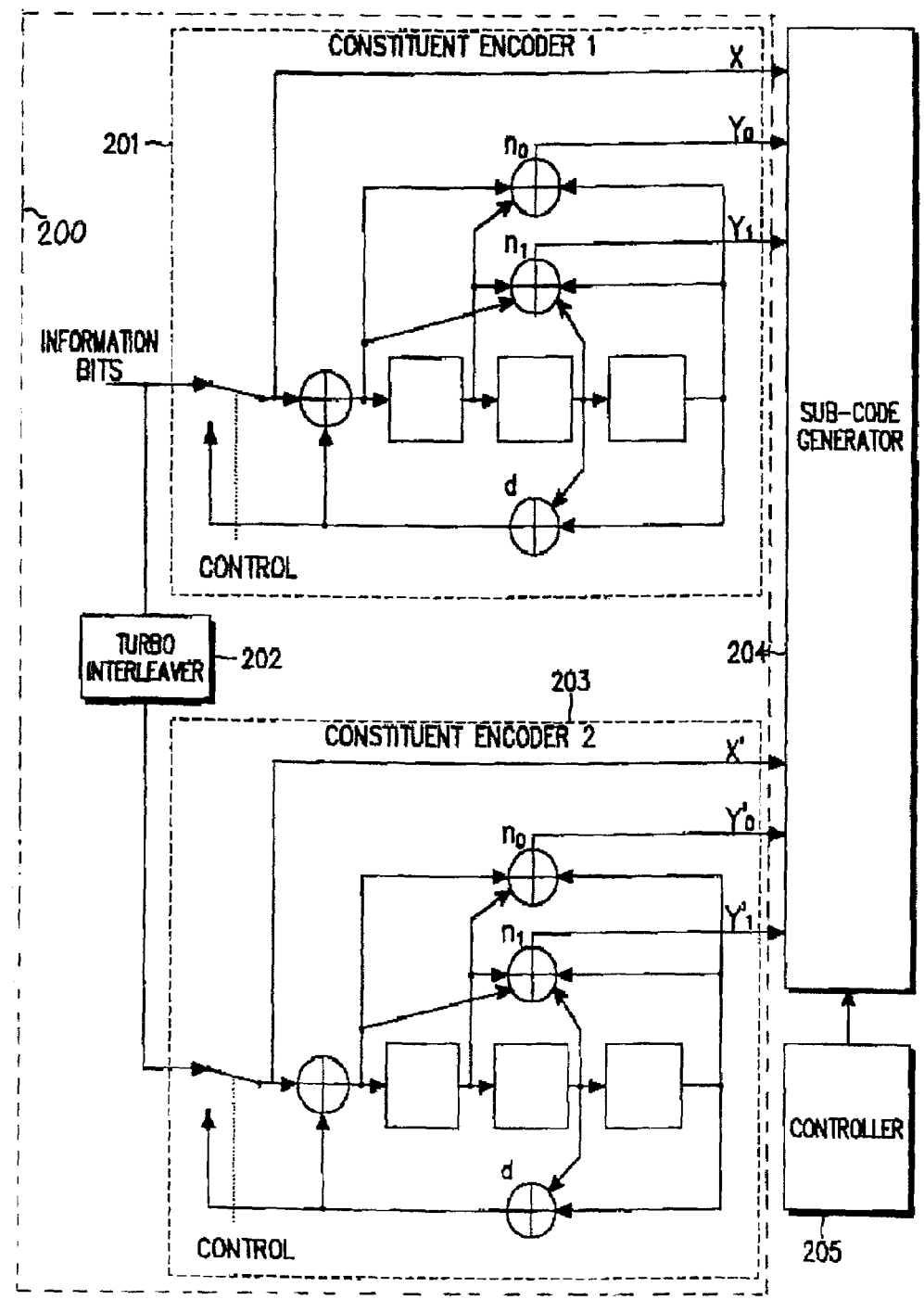
FIG. 2 is a block diagram of a turbo encoder according to an embodiment of the present invention.

| Items | Packet combining | Code combining |
|---|---|---|
| Mother code rate $R_m$ | 1/3 (X, Y0, Y'0) in FIG. 2 | 1/3 (X, Y0, Y'0) in FIG. 2 |
| Block size (L) | 496 | 496 |
| Maximum number of iterations | 8 | 8 |
| Number of transmissions | 2 | 2 |
| Actual Tx code rate RE for each transmission | 2/3 (by puncturing) See section 2 | 2/3 (by puncturing) See section 3 |
| Redundancy selection | Identical pattern for all transmissions. | Different pattern for all transmissions. |
| Soft combining | Packet diversity combining | Packet code combining |
| Gain through retransmissions | Symbol repetition gain | Coding gain for low rate codes |
| Minimum required Eb/No in Table 1 | +0.57 (dB) | R−2/3 +0.57 (dB) R−2/6 −0.55 (dB) |
| Required Eb/No at 2nd retransmissions | +0.57–3.0 (dB) | −0.55–3.0 (dB) |
| Relative performance gain | 0 | 1.12 (=0.57 + 0.55) dB |
| Simulated relative gain (@ BER = $10^{-5}$) | 0 | 2.5 (dB) |

As described above, the packet code combining scheme shows excellent performance in the turbo code-using retransmission system. Therefore, the present invention provides a sub-code generating method for optimal packet code combining in a retransmission system using turbo codes. Generation of sub-codes for packet code combining according to a predetermined rule produces the aforementioned code combining gain and maximizes the performance of a system requesting sub-codes of the same size for each retransmission.

FIG. 2 is a block diagram of a sub-code generating apparatus using turbo codes according to an embodiment of the present invention. As shown in FIG. 2, the sub-code generating apparatus includes a turbo encoder 200, a sub-code generator 204, and a controller 205.

First, with regard to the turbo encoder 200, a first component encoder (or a first constituent encoder) 201 encodes an input information bit stream and outputs first code symbols, i.e., information symbols X and first parity symbols Y0 and Y1. An interleaver 202 interleaves the input information bit stream according to a predetermined rule. A second component encoder (or a second constituent encoder) 203 encodes the interleaved information bit stream and outputs second code symbols, i.e., information symbols X' and second parity symbols Y'0 and Y'1. Thus, the output symbols of the turbo encoder are the first and second code symbols. Since the information symbols X' generated from the second component encoder 203 are not transmitted in reality, the code rate of the turbo encoder is 1/5.

The sub-code generator 204 generates sub-codes from the first and second code symbols received from the first and second component encoders 201 and 203 by puncturing and repetition under the control of the controller 205. The controller 205 stores generated puncturing (and repetition) matrixes and outputs symbol selection signals for the puncturing matrixes to the sub-code generator 204. Then, the sub-code generator 204 selects a predetermined number of code symbols within a predetermined puncturing range according to the symbol selection signals.

The reference characters as used here, X, X', Y0, Y1, Y'0, and Y'1 are defined as follows.

X': turbo interleaved systematic code symbol or information symbols

X: systematic code symbol or information symbol

Y0: redundancy symbol from the upper component encoder of the turbo encoder

Y1: redundancy symbol from the upper component encoder of the turbo encoder

Y'0: redundancy symbol from the lower component encoder of the turbo encoder

Y'1: redundancy symbol from the lower component encoder of the turbo encoder

Hereinbelow, ENC1 (referred to as first code symbols) indicate the information symbols X and the first parity symbols Y0 and Y1 output from the first component encoder 201, and ENC2 (referred to as second code symbols) indicate the second parity symbols Y'0 and Y'1 output from the second component encoder 203.

3. Redundancy Selection (Quasi-Complementary Code Set)

The sub-codes are kinds of complementary codes, although they are not in a strict sense of the term because repeated symbols exist and each sub-code exhibits a different characteristic. In view of the sub-codes being produced from turbo codes, they will be called quasi-complementary turbo codes (QCTCs). An HARQ system employs the following retransmission scheme using QCTCs.

The HARQ system is a major example using packet code combining. Packet code combining is available to the present HARQ systems, HARQ Type I, Type II, and Type III. In these systems, a retransmission technique can be implemented using QCTCs. If a transport unit (TU) is defined as an information bit block being a basic unit for packet transmission, one sub-code $C_i$ is selected for each TU transmission in the hybrid systems.

A retransmission unit and an initial transmission TU can be the same or different in size. For every transmission, the following QCTC set is used.

From a QCTC $C_q$ having a code set size S, a mother code C can be reconstructed, or a new code $C_q$ with a lower code rate than the mother code C can be generated by combining (or code-combining) sub-codes $C_i$ (i=0, 1, 2, . . . ,S–1). The mother code has a minimum code rate available in the encoder. Then, the QCTC is defined as Original code C with code rate R=Rm or code C with code rate R<Rm $$= \bigcup_{i=0}^{S-1} C_i \quad (2)$$

where S is the number of sub-codes with a code rate of Ri and Rm is the mother code rate.

The operation of a system transmitting TUs of the same size for an initial transmission and each retransmission using a QCTC will be described. Needless to say, the transmission scheme using different TUs is also supported in the present invention. Here, S is 4 and R is 1/5.

(Step 1) Transmission is performed on a TU basis and a sub-code $C_i$ of the QCTC is transmitted at the initial transmission and each retransmission.

(Step 2) When the overall code rate of codes produced by soft combining of the initially transmitted and retransmitted packets is greater than 1/5, each sub-code $C_i$ of the QCTC is transmitted in the order of $C_0$, $C_1$, $C_2$, . . . , $C_{S-1}$ at each retransmission request. This is packet code combining.

(Step 3) When the overall code rate of codes produced by soft combining of the initially transmitted and retransmitted packets is less than or equal to 1/5, each sub-code $C_i$ of the QCTC is repeatedly transmitted in the order of $C_0$, $C_1$, $C_2$, . . . , $C_{S-1}$ at each retransmission request. This is packet diversity combining.

(Step 4) The QCTC set size can be an arbitrary value, determined by Rmax and Rmin. For R=1/5 and a sub-code code rate of 2/3 for retransmission, up to four sub-codes can be used.

Table 3 below lists QCTC sets for forward traffic channel packet data rates that are expected to be available in the present IS-2000 1XEVDV system. Here, a mother code rate R=1/5 and a sub-code code rate R=2/3, 1/3, or 1/6

TABLE 3

| Set size S | Code set | Sub-code rate set | Data rates |
|---|---|---|---|
| 1 | {$C_0$} | $C_0$:$R_0$ = 1/6 | 307.2kbps |
|  |  |  | 153.6kbps |
|  |  |  | 76.8kbps |
|  |  |  | 38.4kbps |
|  |  |  | 19.2kbps |
| 2 | {$C_0$, $C_1$} | $C_0$:$R_0$ = 1/3 | 1228.8kbps |
|  |  | $C_1$:$R_1$ = 1/3 | 921.6kbps |
|  |  |  | 614.4kbps |
|  |  |  | 307.2kbps |
| 4 | {$C_0$, $C_1$, $C_2$, $C_3$} | $C_0$:$R_0$ = 2/3 | 2457.6kbps |
|  |  | $C_1$:$R_1$ = 2/3 | 1843.2kbps |
|  |  | $C_2$:$R_2$ = 2/3 | 1228.8kbps |
|  |  | $C_3$:$R_3$ = 2/3 |  |

As seen from Table 3, for a sub-code code rate of 1/6 less than the mother code rate 1/5, the same code $C_0$ is used at each transmission. For a sub-code code rate of 1/3, greater than the mother code rate 1/5, a different code $C_0$ and $C_1$ is used at each transmission. In this case, the code set size S is 2. For a sub-code code rate of 2/3, greater than the mother code rate 1/5, a different code $C_0$, $C_1$, $C_2$, $C_3$ is used at each transmission. The code set size S is 4. When S sub-codes are all transmitted, the receiver can recover the mother code rate R and obtain the maxim coding gain offered by the encoder.

4. Puncturing Matrix for Quasi-complementary Codes

Table 4 illustrates examples of a puncturing matrix for each sub-code code rate.

TABLE 4

| Code rates | $C_0$ | $C_1$ | $C_2$ | $C_3$ |
|---|---|---|---|---|
| R = 1/6 | $\begin{vmatrix} X \\ Y0 \\ Y1 \\ Y'0 \\ Y'1 \end{vmatrix} = \begin{vmatrix} 2 \\ 1 \\ 1 \\ 1 \\ 1 \end{vmatrix}$ | NA | NA | NA |
| R = 1/3 | $\begin{vmatrix} 1 \\ 1 \\ 0 \\ 1 \\ 0 \end{vmatrix}$ | $\begin{vmatrix} 1 \\ 1 \\ 0 \\ 1 \\ 0 \end{vmatrix}$ | NA | NA |

TABLE 4-continued

| Code rates | $C_0$ | $C_1$ | $C_2$ | $C_3$ |
|---|---|---|---|---|
| R = 2/3 | $\begin{vmatrix} 0 & 1 \\ 1 & 0 \\ 0 & 0 \\ 0 & 1 \\ 0 & 0 \end{vmatrix}$ | $\begin{vmatrix} 1 & 0 \\ 0 & 1 \\ 0 & 0 \\ 1 & 0 \\ 0 & 0 \end{vmatrix}$ | $\begin{vmatrix} 0 & 1 \\ 0 & 0 \\ 1 & 0 \\ 0 & 0 \\ 0 & 1 \end{vmatrix}$ | $\begin{vmatrix} 1 & 0 \\ 0 & 0 \\ 0 & 1 \\ 0 & 0 \\ 1 & 0 \end{vmatrix}$ |
| R = 2/3 | $\begin{vmatrix} 1 & 1 & 1 & 1 \\ 1 & 0 & 0 & 0 \\ 0 & 0 & 0 & 0 \\ 0 & 0 & 1 & 0 \\ 0 & 0 & 0 & 0 \end{vmatrix}$ | $\begin{vmatrix} 0 & 0 & 0 & 0 \\ 0 & 1 & 1 & 1 \\ 0 & 0 & 0 & 0 \\ 1 & 1 & 0 & 1 \\ 0 & 0 & 0 & 0 \end{vmatrix}$ | $\begin{vmatrix} 0 & 0 & 0 & 0 \\ 0 & 0 & 0 & 0 \\ 1 & 1 & 0 & 1 \\ 0 & 0 & 0 & 0 \\ 0 & 1 & 1 & 1 \end{vmatrix}$ | $\begin{vmatrix} 1 & 1 & 1 & 1 \\ 0 & 0 & 0 & 0 \\ 0 & 0 & 1 & 0 \\ 0 & 0 & 0 & 0 \\ 1 & 0 & 0 & 0 \end{vmatrix}$ |

As shown in Table 4, when a rate 1/5 turbo code is used as a mother code and a rate 2/3 sub-code is generated with code symbols output for 4 information bits, 20 code symbols are generated from the 4 information bits. The rate 2/3 sub-code is generated by puncturing 14 symbols among the 20 symbols. For packet diversity combining of such sub-codes, $C_0$ produced from the above puncturing matrixes is repeatedly transmitted at each retransmission request. On the other hand, for packet code combining, a different code symbol is transmitted at each retransmission request. After transmitting all sub-codes $C_0$, $C_1$, $C_2$, $C_3$ in the set, the packet diversity combining is executed. For HARQ Type III using packet code combining, full code symbols of the mother code are decoded after four transmission occur.

Meanwhile, "1"s in the puncturing matrixes of Table 4 indicate that the symbols at the positions are selected or transmitted and "0"s indicate that the symbols at the positions are punctured. A "2" indicates that the symbol at the position occurs twice. The puncturing (and repetition) matrixes are designed to satisfy the following conditions.

(Condition 1) An information symbol X is repeated in a sub-code of a QCTC when repetition is used.

(Condition 2) If the information symbol X is repeated in a sub-code of the QCTC using repetition, the repeating period is set to be a minimal constant in the QCTC having all sub-codes in combination.

(Condition 3) If puncturing is used, redundancy symbols except the information symbol X are punctured if possible in the sub-codes of the QCTC.

(Condition 4) If puncturing is used, redundancy symbols except the information symbol X are uniformly punctured if possible in the sub-codes of the QCTC.

A puncturing and repetition matrix with R=1/6 satisfying the above conditions will be described.

In Table 4, for R=1/6, the sequence of transmission code symbols are given as $C_0$: X, X, Y0, Y1, Y'0, Y'1, X, X, Y0, Y1, Y'0, Y'1, . . .

Because six code symbols are generated for the input of one information symbol, the code rate of the sub-code is 1/6. Concerning the puncturing and repetition matrix with R=1/6, decoding is carried out after the symbols X that occur twice are soft-combined and so the real code rate for the decoder is 1/5. The rate 1/5 code, having the energy of the information symbol X increased, has an improved performance, as compared to a rate 1/5 code having a uniform symbol energy across the symbols. In other words, the most appropriate symbol to be repeated is an information symbol. It can be said that the puncturing and repetition matrix with R=1/6 shown in Table 4 is constructed in such a way that information symbol energy is increased through uniform repetition of the information symbols.

For R=1/3 , the sequence of transmission code symbols are given as $C_0$: X, Y0, Y'0, X, Y0, Y'0, X, Y0, Y'0, X, Y0, Y'0, . . .
$C_1$: X, Y1, Y'1, X, Y1, Y'1, X, Y1, Y'1, X, Y1, Y'1, . . .

Because three code symbols are generated for the input of one information symbol, the code rate of the sub-code is 1/3. A different code is transmitted at each transmission due to the use of a different puncturing matrix. After soft combining of $C_0$ and $C_1$, X occurs twice and each of Y0, Y1, Y'0 and Y'1 occurs once. The decoder with a code rate 1/5 can be used in this case and the puncturing matrixes satisfy the above-described conditions, ensuring performance.

In the first case with R=2/3 shown in Table 4, the sequence of transmission code symbols are given as $C_0$: Y0, X, Y'0, Y0, X, Y'0, Y0, X, Y'0, Y0, X, Y', . . .
$C_1$: X, Y'0, Y0, X, Y'0, Y0, X, Y'0, Y0, X, Y'0, Y0, . . .
$C_2$: Y1, X, Y'1, Y1, X, Y'1, Y1, X, Y'1, Y, X, Y'1, . . .
$C_3$: X, Y'1, Y1, X, Y'1, Y1, X, Y'1, Y1, X, Y'1, Y1, . . .

Because three code symbols are generated for the input of two information symbols, the code rate of the sub-code is 2/3. A different code is transmitted at each transmission due to the use of a different puncturing matrix. After soft combining of $C_0$, $C_1$, $C_2$, $C_3$, X occurs twice and each of Y0, Y1, Y'0 and Y'1 occurs once. The decoder with a code rate 1/5 can be used also in this case as for R=1/6 and the puncturing matrixes satisfy the above-described conditions, ensuring performance.

In the second case with R=2/3 shown in Table 4, the sequence of transmission code symbols are given as $C_0$: X, Y0, X, X, Y'0, X, X, Y0, X, X, Y'0, X, X, Y0, X, X, Y'0, X, . . .
$C_1$: Y'0, Y0, Y'0, Y0, Y0, Y'0, Y'0, Y0, Y'0, Y0, Y0, Y'0, . . .
$C_2$: Y1, Y1, Y'1, Y'1, Y1, Y'1, Y1, Y1, Y'1, Y'1, Y1, Y'1, . . .
$C_3$: X, Y'1, X, X, Y'1, X, X, Y'1, X, X, Y'1, X, . . .

Because six code symbols are generated for the input of four information symbols, the code rate of the sub-code is 2/3. A different code is transmitted at each transmission due to the use of a different puncturing matrix. After soft combining of $C_0$, $C_1$, $C_2$, $C_3$, X occurs twice and each of Y0, Y1, Y'0 and Y'1 occurs once. The decoder with a code rate 1/5 can be used also in this case as for R=1/6 and the puncturing matrixes satisfy the above-described conditions, ensuring performance.

5. Transmission Protocol

Since a packet transmission protocol applies to both a forward traffic channel and a reverse traffic channel in adopting HARQ Type III for traffic channels, the bi-directional traffic channels will be termed as "traffic channels" collectively unless there is a need for discriminating them.

5.1. Relationship between Transmission Packet Length and Physical Channel

Packet length is variable in transmitting packets on traffic channels by HARQ Type III. One packet to be transmitted is defined as a Physical Layer Packet (PLP). One PLP may include a plurality of sub-packets called TUs and each TU is also variable in length. Thus, PLP length is variable. Needless to say, one TU can be transmitted in one PLP.

An HARQ Type III protocol will be described below in connection with two main cases. A packet is 1TU, 2TU, 3TU or 4TU in length and each TU has at least 768 or 1536 bits. A packet with TU=768 is called a short format and a packet with TU=1536, a long format. The maximum number of TUs for a PLP is variable, determined according to a data rate on a physical transmission channel. It is assumed here that four TUs are transmitted in one PLP.

One PLP is transmitted on a slot basis. The number of data per slot is variable from 1 to any number, determined by the data rate available from the physical transmission channel. In other words, the number of slots is determined according to the data rate for a PLP. By way of example, two cases are considered: a packet transmitted in a short format with 1 to 32 slots and a packet transmitted in a long format with 2 to 64 slots. This kind of classification is equivalent to the discrimination between TU=768 and TU=1536. On the assumption that a PLP with TU=768 is transmitted in up to 16 slots, the PLP with the TU length is defined as a short format. On the other hand, a PLP with TU=1536 transmitted in up to 32 slots is defined as a long format. The definitions are made based on packet length and have no fundamental relation with the implementation of the HARQ Type III protocol. Yet, they influence the packet length-related system throughput.

5.2. Error Detection from Transmitted Traffic and Retransmission Method

Each TU in a single PLP has an independent error correction code. Therefore, errors can be detected from each TU or from the whole TU in one PLP using one error correction code before a retransmission request can be issued. In reality, a receiver determines whether errors are detected in a received packet and reports the determination result to a transmitter on a PLP basis. However, a retransmitted PLP may have a different TU constitution depending on whether individual TUs have errors in the PLP.

Figure 3:
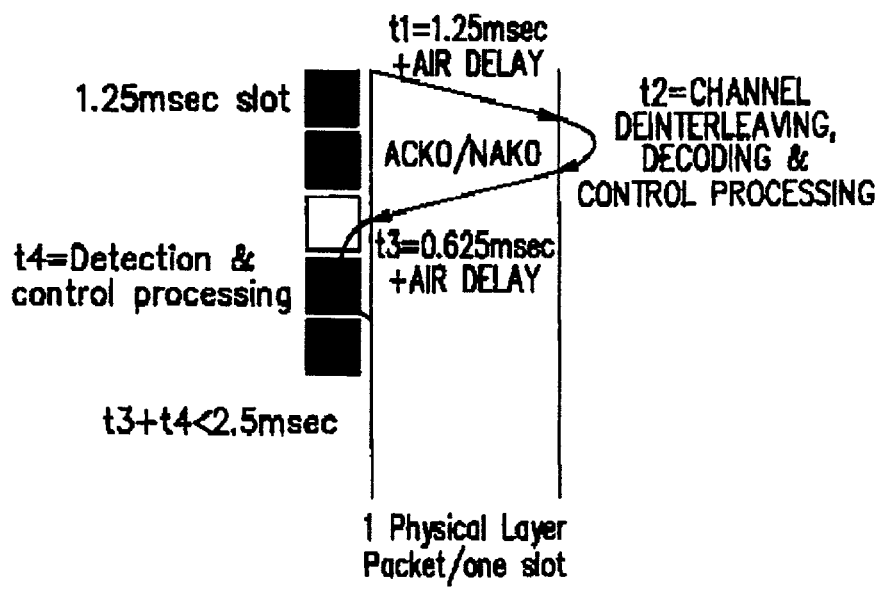
FIG. 3 illustrates an embodiment of packet transmission by HARQ in the case of a Physical Layer Packet (PLP) occupying one slot according to the present invention.

FIG. 3 illustrates an HARQ transmission scheme for a PLP occupying one slot. As shown in FIG. 3, one PLP is interlaced with adjacent three slots for transmission. A different packet can be transmitted in each of four slots and an independent signal ACK/NACK is transmitted on a reverse channel for each packet. In this structure, each PLP may follow an independent Stop-and-Wait ARQ (SW-ARQ) protocol and a predetermined reverse control signal is always transmitted from the receiver to the transmitter. This structure is defined as "modulo N HARQ" and the number of interlaced slots is determined by N=4 in FIG. 3. One user can use the interlaced slots and in this case, each slot is available for PLP transmission. However, the HARQ Type III protocol for the user operates as the Selective Repeat-ARQ (SR-ARQ) and a memory for storing data received in four slots (N=4) must be provided for a physical channel in the receiver. Here, a description will be confined to SW-ARQ without the memory requirement, while the same description is valid to SW-ARQ requiring such a memory capacity.

Figure 4:
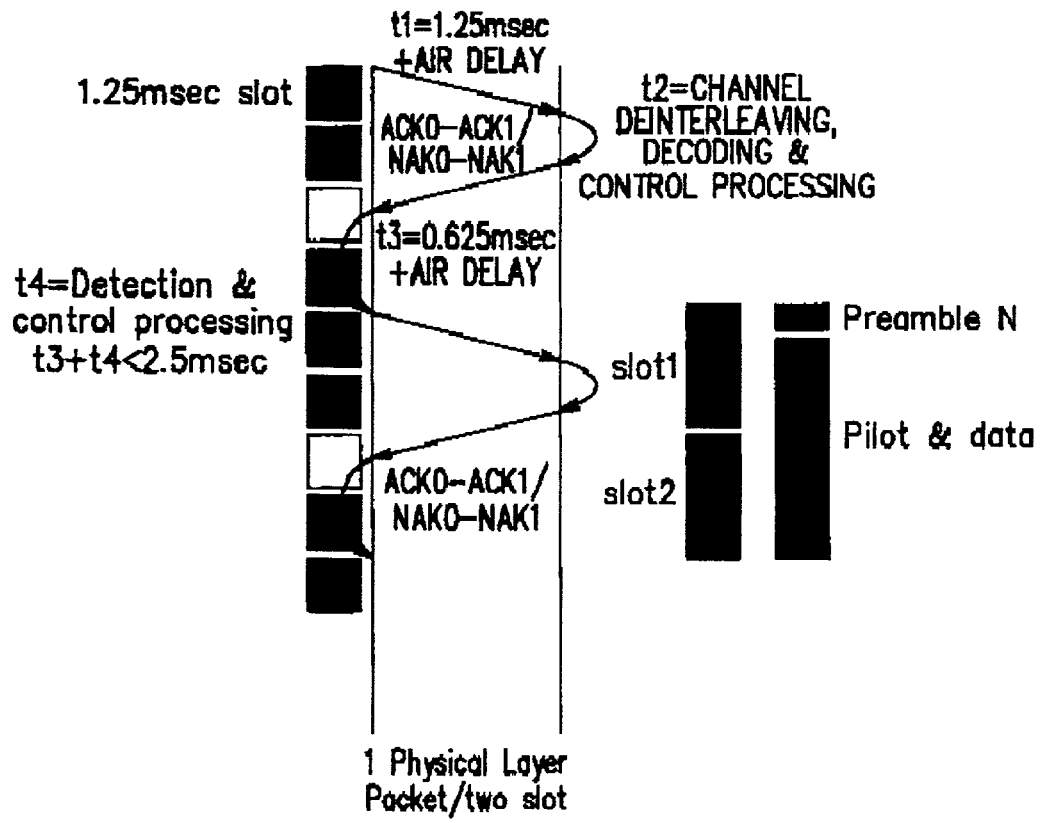
FIG. 4 illustrates another embodiment of packet transmission by HARQ in the case of a PLP occupying two slots according to the present invention.

FIG. 4 illustrates an HARQ transmission scheme for a PLP occupying two slots. As shown in FIG. 4, one PLP is transmitted in two slots interlaced with adjacent three slots. Therefore, the receiver can recover one full PLP after receiving two slots. A different packet can be transmitted in each of four slots and an independent signal ACK/NACK is transmitted for the packet on a reverse channel. Therefore, each PLP follows an independent SW ARQ protocol and a predetermined reverse control signal is transmitted from the receiver to the transmitter in this so-called modulo N HARQ structure. The number of interlaced slots is determined by N.

If NACK is detected from at least one of ACK/NACK indicator bits, the transmitter transmits a retransmission-requested PLP using a quasi-complementary code set shown in Table 5 and Table 6 on a forward traffic channel. Various ACK/NACK combinations can be made from a plurality of ACK/NACK indicator bits and in each case, the transmitter can include TUs in a retransmitted PLP also in various ways. In general, TU transmission must satisfy the following conditions.

(Condition 1) No TUs with ACK are retransmitted.

(Condition 2) TUs with NACK are retransmitted with priority and their transmission priorities depend on their QoS.

(Condition 3) If the total number of bits available for slots of a retransmitted PLP exceeds the number of bits for TUs with NACK, TUs with higher priorities determined according to (Condition 2) are repeatedly transmitted.

(Condition 4) If QoS must be preserved for each TU, a weight is given to the TU to maintain the QoS in retransmission. For example, if QoS for TU0, TU1, TU2, and TU3 are QoS0, QoS1, QoS2 and QoS3 in a PLP having the four TUs, (QoS0+QoS1+QoS2+QoS3)=1.0, and only TU0 is received with ACK and TU1, TU2 and TU3 are received with NACK, the QoS is set for retransmission as follows:

QoS1=QoS1×(1/(QoS0+QoS1+QoS2)) where (QoS0+QoS1+QoS2)<0

QoS2=QoS2×(1/(QoS0+QoS1+QoS2)) where (QoS0+QoS1+QoS2)<0

QoS3=QoS3×(1/(QoS0+QoS1+QoS2)) where (QoS0+QoS1+QoS2)<0

To generalize the above QoS determination process, if one PLP has P TUs, TU0, TU1, TU2, . . . , TU(P-1) and TU(i), TU(j), . . . , TU(s) are received with NACK (here, i, j, . . . , s∈{0, 1, 2, 3, 4, . . . , P-1}, weights for retransmitted TUs are calculated by $$QoS(i)=QoS(i)\times(1/(QoS(i)+QoS(j)+\ldots+QoS(s)))$$
where $(QoS(i)+QoS(j)+\ldots+QoS(s))<0$ $$QoS(j)=QoS(j)\times(1/(QoS(i)+QoS(j)+\ldots+QoS(s)))$$
where $(QoS(i)+QoS(j)+\ldots+QoS(s))<0$ $$QoS(s)=QoS(s)\times(1/(QoS(i)+QoS(j)+\ldots+QoS(s)))$$
where $(QoS(i)+QoS(j)+\ldots+QoS(s))<0$ to thereby reset the number of transmission bits.

Only when all the ACK/NACK indicator bits received on a reverse ACK channel indicate ACK, a new PLP is transmitted on the forward traffic channel.

5.3. Transmission Code Selection for Traffic Channel

A PLP is encoded using a quasi-complementary code for each transmission on a traffic channel. For an initial transmission, $C_0$ is used from a complementary code set with a set size S determined according to a PLP data rate for the traffic channel in Table 5 and Table 6. Then, every time NACK is received on the reverse ACK channel, codes are selected in the circulating order of $C_1$, $C_2$, . . . , $C_{S-1}$, $C_0$, $C_1$, . . . for the traffic channel.

TABLE 5

| Data Rates (kbps) | Slots/ PLP | TU/ PLP | Code Rate | Repetition | ACK/NACK Period (slots) | ACK Indicator Bits/Reverse ACK Channel | Quasi Complementary Code Set |
|---|---|---|---|---|---|---|---|
| 19.2 | 32 | 1 | 1/6 | 16 | 2 × 4 | 1 | {$C_0$} |
| 38.4 | 16 | 1 | 1/6 | 8 | 2 × 4 | 1 | {$C_0$} |
| 76.6 | 8 | 1 | 1/6 | 4 | 2 × 4 | 1 | {$C_0$} |

TABLE 5-continued

| Data Rates (kbps) | Slots/ PLP | TU/ PLP | Code Rate | Repetition | ACK/NACK Period (slots) | ACK Indicator Bits/Reverse ACK Channel | Quasi Complementary Code Set |
|---|---|---|---|---|---|---|---|
| 153.6 | 4 | 1 | 1/6 | 2 | 2 × 4 | 1 | $\{C_0\}$ |
| 307.2 | 2 | 1 | 1/6 | 1 | 2 × 4 | 1 | $\{C_0\}$ |
| 614.4 | 1 | 1 | 1/3 | 1 | 1 × 4 | 1 | $\{C_0, C_1\}$ |
| 307.2 | 4 | 2 | 1/3 | 2 | 2 × 4 | 2 | $\{C_0, C_1\}$ |
| 614.4 | 2 | 2 | 1/3 | 1 | 2 × 4 | 2 | $\{C_0, C_1\}$ |
| 1228.8 | 1 | 2 | 2/3 | 1 | 1 × 4 | 2 | $\{C_0, C_1, C_2, C_3\}$ |
| 921.6 | 2 | 3 | 1/3 | 1 | 2 × 4 | 3 | $\{C_0, C_1\}$ |
| 1843.2 | 1 | 3 | 2/3 | 1 | 1 × 4 | 3 | $\{C_0, C_1, C_2, C_3\}$ |
| 1228.8 | 2 | 4 | 1/3 | 1 | 2 × 4 | 4 | $\{C_0, C_1\}$ |
| 2457.6 | 1 | 4 | 1/3 | 1 | 1 × 4 | 4 | $\{C_0, C_1, C_2, C_3\}$ |

TABLE 6

| Data Rates (kbps) | Slots/ PLP | TU/ PLP | Code Rate | Repetition | ACK/NACK Period (slots) | ACK Indicator Bits/Reverse ACK Channel | Quasi Complementary Code Set |
|---|---|---|---|---|---|---|---|
| 19.2 | 32 | 1 | 1/6 | 16 | 2 × 8 | 1 | $\{C_0\}$ |
| 38.4 | 16 | 1 | 1/6 | 8 | 2 × 8 | 1 | $\{C_0\}$ |
| 76.6 | 8 | 1 | 1/6 | 4 | 2 × 8 | 1 | $\{C_0\}$ |
| 153.6 | 4 | 1 | 1/6 | 2 | 2 × 8 | 1 | $\{C_0\}$ |
| 307.2 | 2 | 1 | 1/6 | 1 | 2 × 8 | 1 | $\{C_0\}$ |
| 614.4 | 1 | 1 | 1/3 | 1 | 1 × 8 | 1 | $\{C_0, C_1\}$ |
| 307.2 | 4 | 2 | 1/3 | 2 | 2 × 8 | 2 | $\{C_0, C_1\}$ |
| 614.4 | 2 | 2 | 1/3 | 1 | 2 × 8 | 2 | $\{C_0, C_1\}$ |
| 1228.8 | 1 | 2 | 2/3 | 1 | 1 × 8 | 2 | $\{C_0, C_1, C_2, C_3\}$ |
| 921.6 | 2 | 3 | 1/3 | 1 | 2 × 8 | 3 | $\{C_0, C_1\}$ |
| 1843.2 | 1 | 3 | 2/3 | 1 | 1 × 8 | 3 | $\{C_0, C_1, C_2, C_3\}$ |
| 1228.8 | 2 | 4 | 1/3 | 1 | 2 × 8 | 4 | $\{C_0, C_1\}$ |
| 2457.6 | 1 | 4 | 1/3 | 1 | 1 × 8 | 4 | $\{C_0, C_1, C_2, C_3\}$ |

If three consecutive NACKs are received on the reverse ACK channel, sub-codes are used in the order of $C_1$, $C_2$, and $C_3$ for the forward traffic channel. If two more NACKs are received, the sub-codes $C_0$ and $C_1$ are used. If ACK is then received, transmission is discontinued and a new PLP is transmitted on the forward traffic channel. The transmitter does not notify the type of a quasi-complementary code for each retransmission but it is known beforehand to both the transmitter and the receiver that the codes are transmitted in the circulating order of 0, 1, 2, . . . , S–1, 0, 1, . . . according to the set size S determined by the data rates. The type of the selected QCTC sub code among S sub codes 6. Structure of Reverse ACK Channel and Transmission on the Channel The receiver transmits a message indicating whether an error is detected for each received PLP on the reverse ACK channel. An ACK/NACK indicator bit is transmitted for each TU of the PLP by an ACK/NACK message. Therefore, if four independent TUs are transmitted on the forward traffic channel, the reverse ACK channel transmits four ACK/NACK bits. That is, as many ACK/NACK bits as TUs are transmitted.

6.1. Periodical Transmission of ACK/NACK Signal on Reverse ACK Channel

In the inventive HARQ scheme of the present invention, a predetermined ACK/NACK transmission period is used irrespective of an SR-ARQ or SW-ARQ protocol and the ACK/NACK signal period is determined according to the traffic data rate. Since the length of each sub-code transmitted on a traffic channel is one or two slots, a sub-code corresponding to one PLP is always received in two slots at the longest. In other words, all codes used for traffic transmission are designed to be completely transmitted in one or two slots. Therefore, an ACK/NACK signal is transmitted in one- or two-slot units with a predetermined interval. Table 3 and Table 4 illustrate sub-codes for data rates.

The ACK/NACK message is transmitted on the reverse ACK channel as specified in Table 5 or Table 6 according to the packet data rate and packet format of a PLP received on a traffic channel and according to whether the PLP occupies interlaced multiple slots. If the PLP uses four interlaced slots in a short format, it can be considered separately in two ways according to its period: four slots (5 msec) and eight slots (10 msec). That is, the receiver time-multiplexes the ACK/NACK message in the first half of the second slot from the traffic reception time. Therefore, the ACK/NACK message is always transmitted one slot after the receiver receives the traffic.

The first ACK/NACK message transmitted on the reverse ACK channel after receiving the PLP on the traffic channel is labeled with ACK/NACK #1. Then, in the case of a four slot period as shown in FIG. 3, each ACK/NACK message is used for early termination regardless of whether it is an odd-numbered message or an even-numbered message. The ACK/NACK message is also used as a control message for changing a quasi-complementary sub-code for PLP retransmission on the forward traffic channel.

On the other hand, in the case of an eight slot period as shown in FIG. 4, each ACK/NACK message is used for early termination regardless of whether it is an odd-numbered message or an even-numbered message and only an even-numbered ACK/NACK message is used as a control message for changing a quasi-complementary sub-code for PLP retransmission.

Early termination refers to discontinuation of slot transmission for a PLP on a traffic channel before all slots assigned to the PLP are transmitted in a situation where the PLP can be received without errors, and then transmission of a new PLP, to thereby increase transmission throughput.

Meanwhile, if the PLP is in a long format, it can also be considered separately in two ways according to its period: 8 slots (10 msec) and 16 slots (20 msec). An odd-numbered ACK/NACK message and an even-numbered ACK/NACK message functions in the same way as for the short format.

6.2. Implementation of Transmission Protocol

Figure 5:
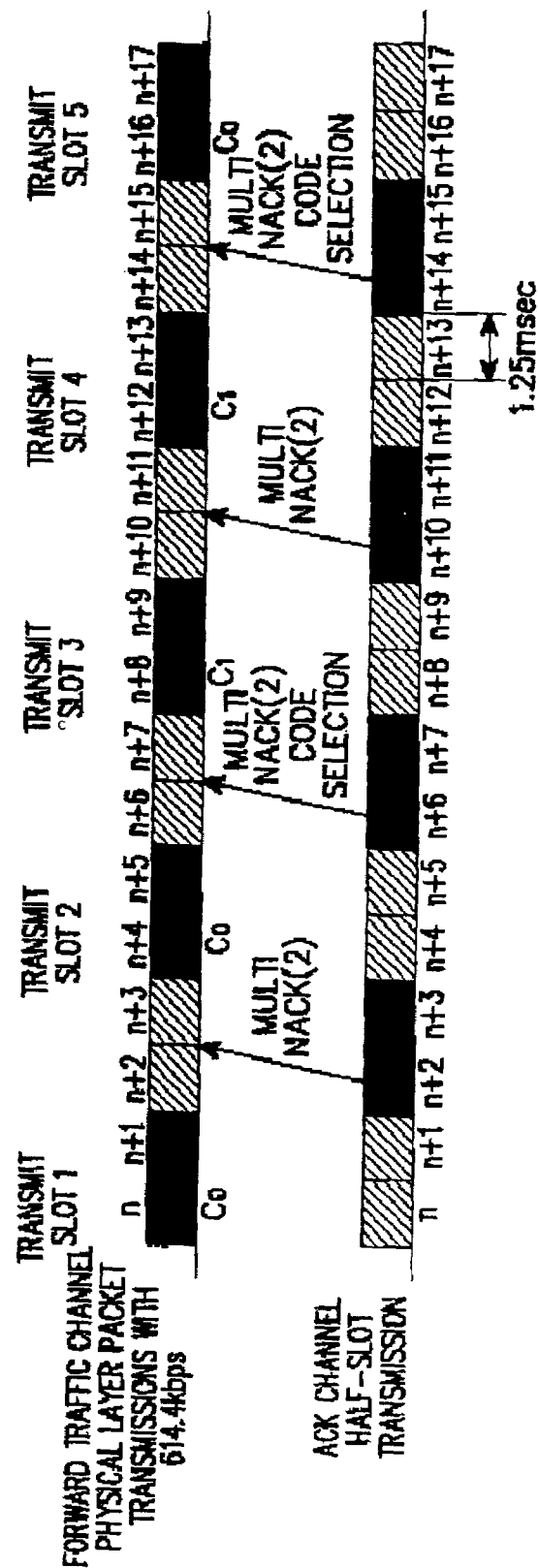
FIG. 5 illustrates data transmission in forward and reverse slots according to ACK/NACK messages in connection with FIG. 3.
Figure 6:
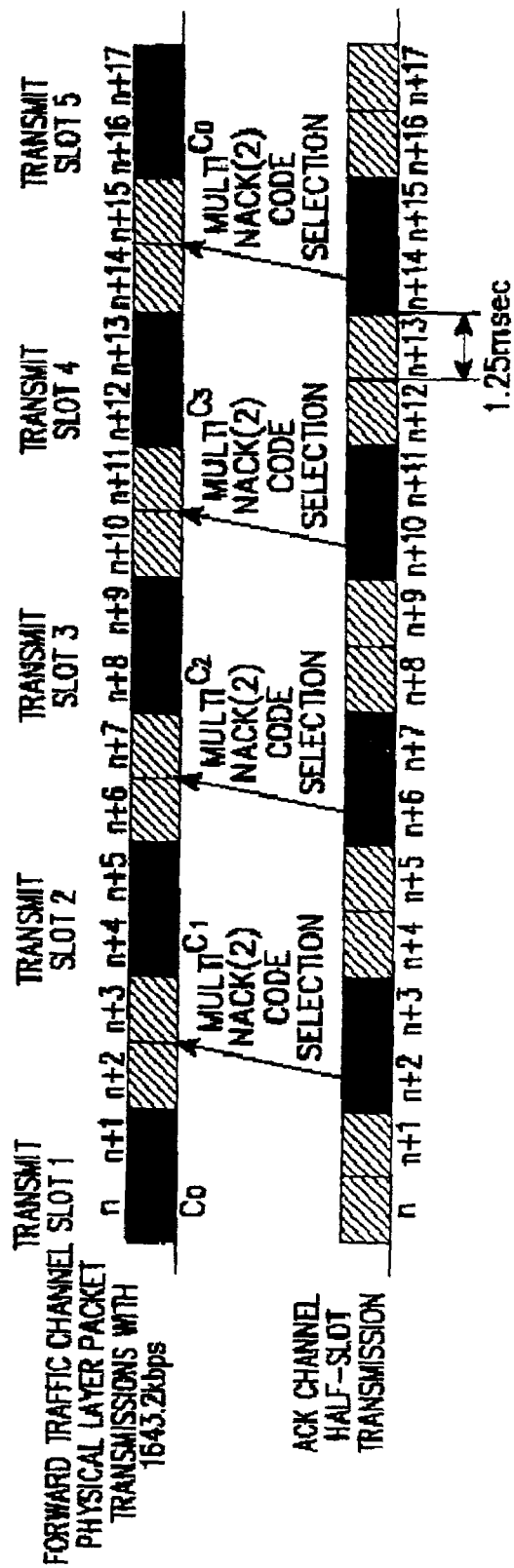
FIG. 6 illustrates data transmission in forward and reverse slots according to ACK/NACK messages in connection with FIG. 4.

FIGS. 5 and 6 illustrate forward and reverse slot transmissions according to the present invention. As stated before, transmission of the ACK/NACK message is controlled separately for 1 slot/PLP and 2 slots/PLP for all data rates.

FIG. 5 illustrates slot processing by HARQ for 1 slot/PLP and FIG. 6 illustrates slot processing by HARQ for 2 slots/PLP. They differ in whether a sub-code change for retransmission occurs at one slot level or at a two slot level.

Figure 7:
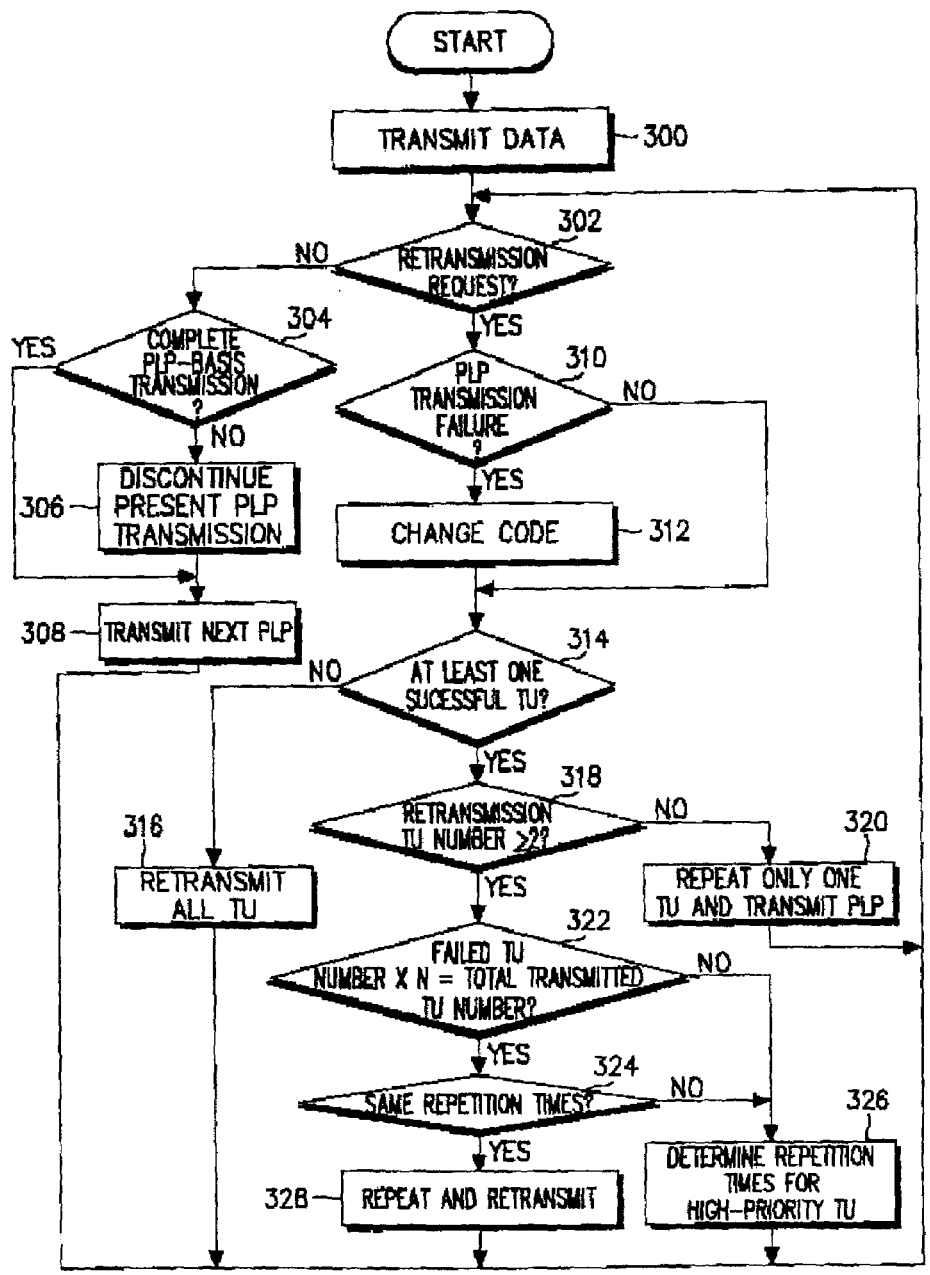
FIG. 7 is a flowchart illustrating an embodiment of a data retransmission procedure when a multiple data service is provided according to the present invention.

FIG. 7 is a flowchart illustrating an embodiment of a control operation for data retransmission when a multiple data service is provided according to the present invention. For better understanding, it is assumed hereinafter that a transmitter transmitting multiple data is provided to a base station and a receiver to a UE (User Equipment), that is, multiple data is transmitted on a forward link.

Referring to FIG. 7, the transmitter transmits multiple data to a user receiving the multiple data service in step 300. Each service data (Tus, s=0, 1, 2, . . . ) is encoded according to the data rate prior to transmission and a PLP structure vanes with the data rate and the number of Tus. The case where a PLP has four different TUs will be described with reference to FIG. 8.

Figure 8:
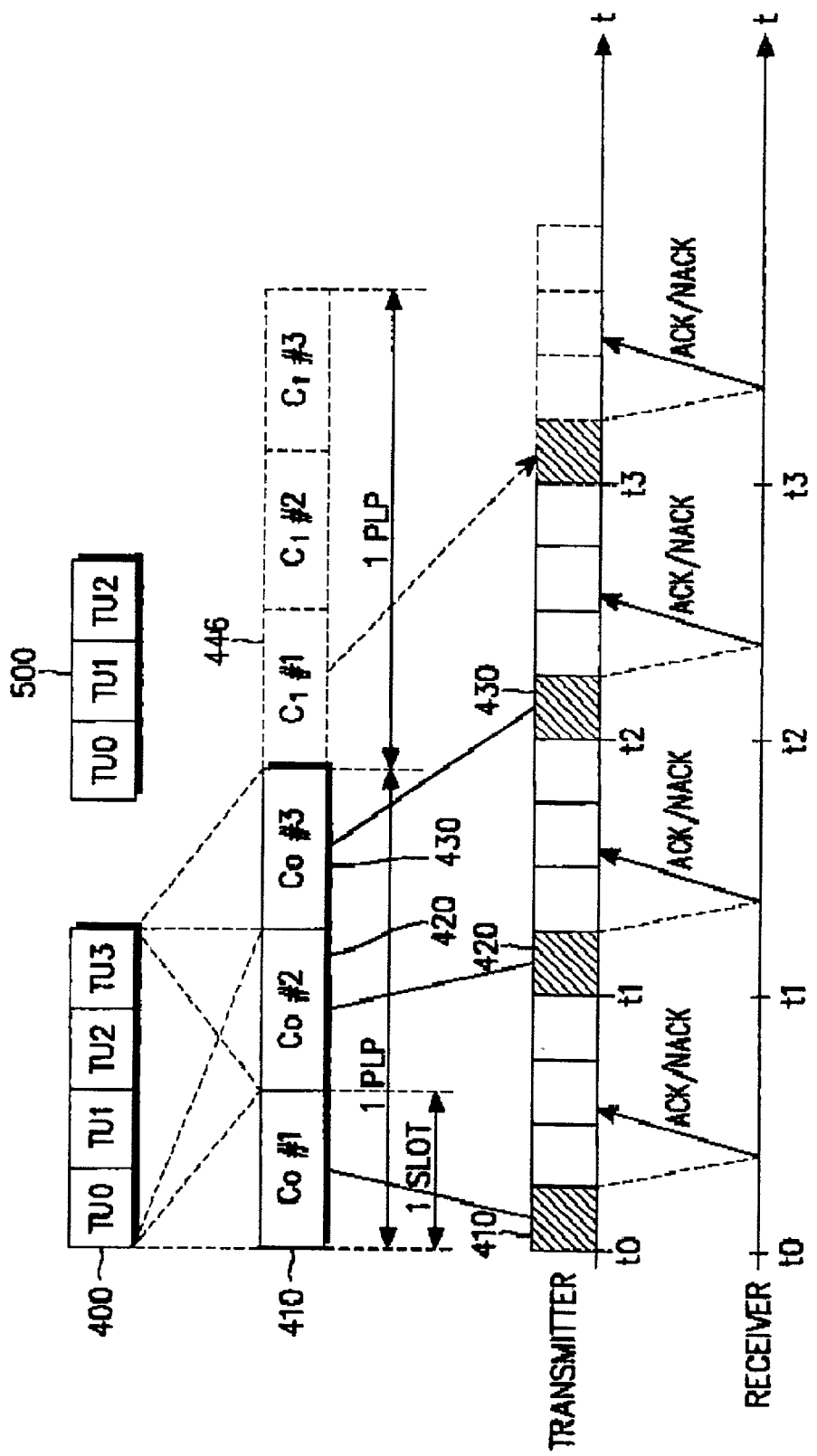
FIG. 8 is a view illustrating a data flow between a transmitter and a receiver for multiple data retransmission according to the present invention.

FIG. 8 is a diagram showing data flow between the transmitter and the receiver, referred to for describing retransmission of multiple data according to the present invention.

If a PLP directed to a particular user includes four different data TU0, TU1, TU2 and TU3 as indicated by reference numeral 400, the code rate and data rate of the PLP are determined in the above-described method. A PLP is not a real transmission unit in the air but a processing unit in the higher layer. In the air, the PLP can be transmitted in a plurality of slots. As shown in FIG. 8, one PLP 410 can be transmitted in three slots. The following description is made for the case where four different TUs constitute one PLP and the PLP is transmitted to receiver during [in] three slots.

In step 300, the transmitter transmits a PLP with four different multiple data TU0 to TU3 as indicated by reference numeral 400 in FIG. 8. The multiple data are interleaved and uniformly distributed in PLP data 410 to 430. For initial transmission, the PLP is encoded with the first code $C_0$. The PLP can be transmitted at one time in three consecutive slots or separately a plurality of times at every predetermined period. In the embodiment of the present invention, the PLP is transmitted in the latter method by way of example.

Therefore, the PLP data 410 is first transmitted in step 300. Due to interleaving as described above, the first PLP data 410 has all four multiple data TU0 to TU3. Since the PLP is transmitted periodically in three separate slots, the transmitter transmits the PLP for the particular user at time to, and then data for other users. The PLP data are marked in FIG. 8. The PLP data arrive at the receiver with a time delay according to the channel environment and the distance between the transmitter and the receiver. The receiver decodes the delayed PLP data and transmits a multi-response signal for the PLP data to the transmitter. After decoding, the receiver performs a CRC (Cyclic Redundancy Code) check on the four different data TU0 to TU3 and determines that the data is good when it proves CRC-good. The term "decoding success" will be used below in the sense that the CRC of decoded data is checked to be good. The multi-response signal includes a message indicating successful reception (ACK) or failed reception (NACK) for each TU. The ACK message indicates decoding success and the NACK message, decoding failure. The receiver transmits the multi-response signal for the multiple data to the transmitter. The response signal for each TU can be one bit or two bits. In the following description, the response signal for each TU occupies one bit and if it is set to 1, this implies successful reception and if it is set to 0, this implies failed reception.

When the decoding results of the four TUs are all good, the ACK/NACK signal is "1111" and when they are all bad, the ACK/NACK signal is "0000". In this manner, reception success or reception failure can be determined for each received TU.

Returning to FIG. 7, after transmitting the first PLP data 410, the transmitter monitors reception of a multi-response signal for the PLP data. Upon receipt of the multi-response signal, the transmitter determines whether retransmission is requested in step 302. Retransmission is requested when reception failure occurs to at least one CRC-bad TU in the PLP data. Upon a retransmission request, the process goes to step 310. If the overall PLP data are CRC-good in the receiver, the transmitter goes to step 304.

In step 304, the transmitter checks whether reception success has occurred for the one PLP, that is, whether an ACK signal has been received for the third PLP data 430 in the third slot Co #3 encoded with the code $C_0$ indicated as 410 in FIG. 8.

The reason for performing step 304 is that successful reception of all the PLP data can occur in different ways. More specifically, the first PLP data 410 is transmitted at time to in slot Co #1, the second PLP data 420 at time $t_1$ in slot Co #2, and the third PLP data 420 at time $t_2$ in slot Co #3. The reception result of the first PLP data 410 is reported between time to and time $t_1$, the reception result of the second PLP data 420 between time $t_1$ and time $t_2$, and the reception result of the third PLP data 430 between time $t_2$ and time $t_3$. When a PLP is divided into three slot data, therefore, the transmitter initiates transmitting the next PLP in step 308 after transmitting the third PLP data 430 and then receiving a multi-response signal for all TUs TU0 to TU3 of the PLP data 430. Referring to FIG. 8, when the first PLP 400 includes four different data TU0 to TU3 and the second PLP 500 includes three different data TU0, TU1 and TU2, the second PLP 500 is transmitted after the first PLP 400.

On the other hand, when the transmitter receives a multi-response signal indicating all TUs are CRC-good for the transmitted PLP data before the PLP-basis transmission is completed, that is, it receives an ACK signal for the first slot Co#1 or the second slot Co #2, the transmitter proceeds from step 304 to step 306, discontinues transmission of the present PLP data, and goes to step 308. For example, if the first slot Co #1 has been successfully received, the transmitter transmits a new PLP (500 in FIG. 8) without transmitting the second and third slots Co #2 and Co #3. One point to be noted here is that numerals labeled to TUs in FIG.

8 represent just the sequence of the multiple data and thus TU0 in the PLP 400 can be identical to or different from TU0 in the PLP 500. The PLP 500 can be transmitted in three slots like the previous PLP 400 or in more or less slots.

Meanwhile, if the multi-response signal represents a retransmission request in step 302, the transmitter checks whether the transmission failure has occurred on a PLP basis in step 310. and then in step 312, the transmitter takes the next available code, for example, $C_1$ for the PLP. The PLP-basis transmission refers to transmission of all three slot data 410, 420 and 430 separated from the PLP 400 (TU0, TU1, TU2, TU3). After transmission of the first PLP data 410, the second and third PLP data 420 and 430 can be differently constituted according to the reception result of the first PLP data 410. The data construction after the initial transmission will be described in more detail referring to FIG. 9. It is determined whether the PLP-basis transmission is completed by counting the number of transmissions of the PLP with respect to the slot number of the PLP.

In step 314, the transmitter determines whether there is a successfully transmitted TU by monitoring the retransmission request signal. Since the multi-response signal represents ACK/NACK for each TU, it is determined whether at least one TU is successfully transmitted by checking the multi-response signal.

If at least one TU has been successfully received in the receiver in step 314, the transmitter goes to step 318 and otherwise, it goes to step 316. When no successfully decoded data exist in the receiver, the transmitter retransmits all the transmitted PLP data in step 316. Here, the retransmission can be considered in two ways: when one PLP is fully transmitted, the next available code is taken and the PLP is retransmitted with the code; and when the PLP is not completely transmitted, for example, only the first PLP data 410 or only the first and second PLP data 410 and 420 are transmitted, the transmitted PLP data is retransmitted with the original code in the following slot.

In step 318, the transmitter determines whether two or more TUs are to be retransmitted. If two or more TUs are to be retransmitted, the transmitter goes to step 322. In this case, since the transmitter must transmit the failed TU at the same data rate as in the initial transmission, it encodes the one failed TU and reconstructs a PLP in the same form as for the transmission of the four data. For example, if only TU0 is failed, the transmitter simply retransmits TU0. In constructing a PLP, four TUs are needed as in the initial transmission. Therefore, the transmitter repeats TU0 in the places of TU1, TU2 and TU3. After the thus-construction of the PLP only with the failed TU, the transmitter divides the PLP into slots. That is, the new PLP is divided into slot data.

Meanwhile, if two or more TUs are to be retransmitted, the transmitter determines whether the total number of transmitted TUs is an integer-multiple of the number of the failed TUs in step 322. Referring to FIG. 8, since four TUs are transmitted, two TUs must be successful and the other two TUs must be failed to satisfy the above condition. While four TUs are transmitted in the embodiment of the present invention, it is the same as in the case of six or eight TUs. If the condition is satisfied in step 322, the transmitter goes to step 324 and if it is not, the transmitter goes to step 326.

In step 324, the transmitter determines whether the retransmission-requested TUs are to be repeated the same number of times according to their ToS (Type of Service) or QoS which can be listed beforehand in the form of a table or determined using an algorithm. If the failed TUs are to be repeated the same number of times, the transmitter goes to step 328 and otherwise, it goes to step 326.

In step 328, the transmitter sequentially repeats the TUs, or inserts one TU as many times as determined and then the next data the same repetition times. On the other hand, if different repetition times must be taken or the total number of the transmitted TUs is not an integer-multiple of the failed TUs, the transmitter determines how many times the failed TUs are to be repeated according to their priority in step 326. Only one TU with the highest priority can be repeated, or the failed TUs can be repeated a different number of times according to their priority. This is system implementation-dependent.

Data retransmission will be described in more detail referring to FIG. 9.

Figure 9:
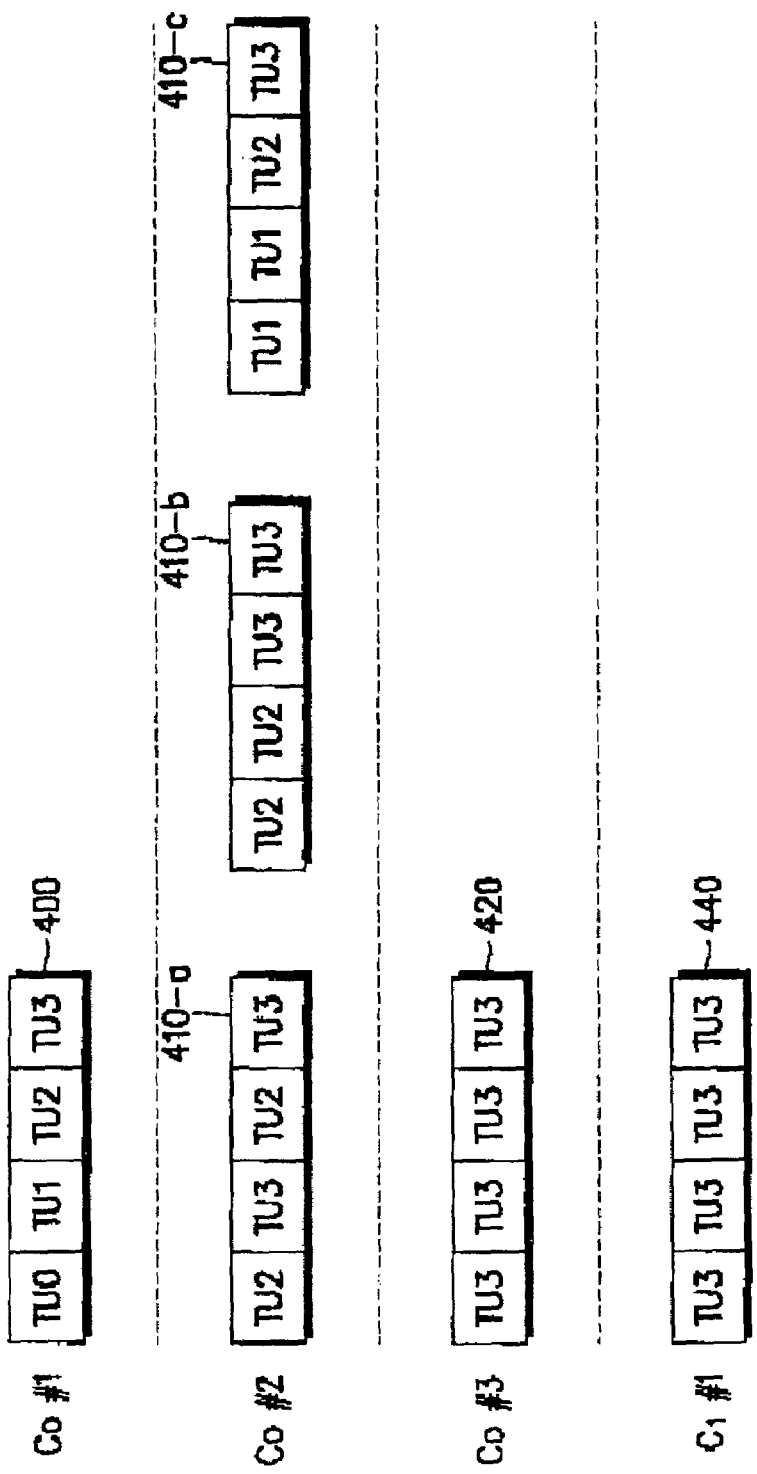
FIG. 9 illustrates repeated data for data retransmission according to the present invention.

FIG. 9 illustrates repeated data for retransmission according to the present invention.

One PLP includes four different TUs, is encoded with a code selected in the order of $C_0, C_1, \ldots$ for each transmission, and is transmitted in three slots. The first PLP data 400 (TU0 to TU3) is encoded with the first code $C_0$ and the encoded TUs are transmitted in the first slot Co #1. The transmitter transmits the first slot Co #1 at time $t_0$. After a predetermined time, the receiver receives the first PLP data 410, decodes it, and detects CRC-good TUs from the decoded data. The receiver transmits ACK signals for the CRC-good TUs and NACK signals for the CRC-bad Tus to the transmitter. ACK/NACK is transmitted for each TU by a multi-response signal bit. If the receiver transmits a multi-response signal "1100", this represents that TU0 and TU1 are CRC-good and TU2 and TU3 are CRC-bad. The CRC-bad TUs are repeated in the next slot Co #2 and encoded with the code $C_0$. In FIG. 9, if the two TUs are repeated the same number of times, they alternately occur twice as indicated by reference numeral 410-*a* and 410-*b*, or one of them occurs consecutively twice and then the other follows consecutively twice as indicated by reference numeral 410-*b*. If the multi-response signal is "1000" and TU1 has the highest priority, only TU1 can occur twice as indicated by reference numeral 410-*c*. In this case, TU1 can be positioned between TU2 and TU3 or at the last. That is, the positions of repeated TUs can be changed. When TU3 is again CRC-bad, only TU3 can be repeated in the four positions for the third slot Co #3. Despite the transmission, when the same TU3 is CRC-bad, only TU3 is encoded with the next code $C_1$ for retransmission. This procedure is repeated until the PLP is error-free.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of transmitting a physical layer information stream having a plurality of sub-blocks that have a different QoS (Quality of Service), comprising the steps of:

encoding the physical layer information stream using quasi-complementary turbo codes (QCTCs);

dividing the encoded physical layer information stream into a plurality of slots;

transmitting one of the plurality of slots to a receiver;

upon receipt of indication information that the receiver fails to receive at least one of the sub-blocks in the transmitted slot, repeating the at least one sub-block that the receiver failed to receive within a number of the sub-blocks constituting the physical layer information stream, and re-transmitting the at least one repeated sub-block.

2. The method of claim 1, wherein if the at least one of the sub-blocks having the error is transmitted at least twice, the slot data repeats only the at least one of the sub-blocks and includes the number of the sub-blocks.

3. The method of claim 2, wherein repetition times of the at least one of the sub-blocks are determined according to the priorities of the sub-blocks have a different QoS.

4. The method of claim 3, wherein if the number of the transmitted sub-blocks is an integer-multiple of the number of the at least one of the sub-blocks, the at least one of the sub-blocks are repeated a same number of times if the at least one of the sub-blocks have a same priority.

5. The method of claim 4, wherein if the sub-blocks are transmitted at least twice and a signal is received before the sub-blocks are transmitted at least twice, indicating that the transmitted sub-blocks have been successfully received in the receiver, the transmission of rest of the sub-blocks to be transmitted is discontinued and transmitting a next physical layer information stream having a plurality of sub-blocks.

6. The method of claim 1, wherein a code set is generated prior to initial transmission and the initial transmission is performed using a predetermined code in the code set.

7. The method of claim 1, wherein if at least one sub-block is retransmitted after the sub-blocks are transmitted a predetermined number of times, the code of the retransmission-requested sub-block is changed.

8. The method of claim 7, wherein the code is changed to an unused code in the code set in a predetermined order.

9. The method of claim 8, wherein upon receipt of a retransmission request after retransmission-requested sub-blocks are transmitted using all the codes of the code set, the retransmission-requested sub-block is transmitted using a code selected in the predetermined order starting from the code for initial transmission.

* * * * *